(12) United States Patent
Keller et al.

(10) Patent No.: US 9,620,142 B2
(45) Date of Patent: Apr. 11, 2017

(54) SELF-VOICE FEEDBACK IN COMMUNICATIONS HEADSETS

(71) Applicant: Bose Corporation, Framingham, MA (US)

(72) Inventors: Shaun Cassidy Keller, Lexington, MA (US); Paul D. Gjeltema, Stow, MA (US); Jordan Jeffery Bonner, Watertown, MA (US); Simon G. Ravvin, Ashland, MA (US)

(73) Assignee: Bose Corporation, Framingham, MA (US)

( * ) Notice: Subject to any disclaimer, the term of this patent is extended or adjusted under 35 U.S.C. 154(b) by 277 days.

(21) Appl. No.: 14/303,697

(22) Filed: Jun. 13, 2014

(65) Prior Publication Data

US 2015/0364145 A1    Dec. 17, 2015

(51) Int. Cl.
| | |
|---|---|
| *H03G 3/20* | (2006.01) |
| *G10L 21/0208* | (2013.01) |
| *G10K 11/178* | (2006.01) |
| *H04M 1/58* | (2006.01) |
| *H04R 3/00* | (2006.01) |
| *H04M 1/60* | (2006.01) |
| *H04R 1/10* | (2006.01) |

(52) U.S. Cl.
CPC ...... *G10L 21/0208* (2013.01); *G10K 11/1786* (2013.01); *G10K 11/1788* (2013.01); *H04M 1/585* (2013.01); *H04M 1/6066* (2013.01); *H04R 3/005* (2013.01); *H04R 1/1008* (2013.01); *H04R 2460/05* (2013.01)

(58) Field of Classification Search
CPC ............ G10L 21/0208; G10K 11/1786; G10K 11/1788

USPC .................................. 704/226; 381/57, 71.6
See application file for complete search history.

(56) References Cited

U.S. PATENT DOCUMENTS

| | | | |
|---|---|---|---|
| 7,627,352 B2 | 12/2009 | Gauger, Jr. et al. | |
| 7,920,903 B2 | 4/2011 | Ueda et al. | |
| 8,447,370 B2 | 5/2013 | Ueda et al. | |
| 8,488,829 B2 | 7/2013 | Ring | |
| 8,620,650 B2 | 12/2013 | Walters et al. | |
| 2005/0060142 A1* | 3/2005 | Visser ................ | G10L 21/0208 704/201 |
| 2006/0120537 A1* | 6/2006 | Burnett ............. | G10K 11/1784 381/71.6 |
| 2007/0032259 A1* | 2/2007 | Gounaris ........... | H04M 1/6016 455/550.1 |
| 2009/0161885 A1* | 6/2009 | Donaldson ......... | G10K 11/1788 381/71.6 |

(Continued)

FOREIGN PATENT DOCUMENTS

| | | |
|---|---|---|
| EP | 2217005 A1 | 8/2010 |
| JP | H10294989 A | 11/1998 |

OTHER PUBLICATIONS

International Search Report and Written Opinion dated Dec. 14, 2015 for International application No. PCT/US2015/034915.

*Primary Examiner* — Pierre-Louis Desir
*Assistant Examiner* — Forrest F Tzeng (57) ABSTRACT

Techniques for providing self-voice feedback in a communications headset include processing signals carrying near-end speech in parallel digital and analog signal processing paths to produce a combined gain-adjusted near-end signal carrying the near-end speech for output to transducers of the communications device.

19 Claims, 3 Drawing Sheets

(56) References Cited

U.S. PATENT DOCUMENTS

| | | | | |
|---|---|---|---|---|
| 2010/0166203 A1* | 7/2010 | Peissig | ............... | G10K 11/1788 |
| | | | | 381/71.6 |
| 2012/0076311 A1* | 3/2012 | Isabelle | ............... | G10L 21/0208 |
| | | | | 381/57 |
| 2012/0253798 A1* | 10/2012 | Walters | ............... | G10L 21/0208 |
| | | | | 704/226 |
| 2013/0003983 A1* | 1/2013 | Hata | ................... | G10K 11/1786 |
| | | | | 381/71.6 |
| 2013/0289986 A1* | 10/2013 | Graylin | ................... | H04M 1/05 |
| | | | | 704/235 |
| 2014/0126733 A1* | 5/2014 | Gauger, Jr. | .......... | H04R 1/1083 |
| | | | | 381/71.6 |
| 2014/0126734 A1* | 5/2014 | Gauger, Jr. | ............ | H04R 3/002 |
| | | | | 381/71.6 |
| 2014/0126735 A1* | 5/2014 | Gauger, Jr. | ........ | G10K 11/1788 |
| | | | | 381/71.6 |
| 2014/0126756 A1* | 5/2014 | Gauger, Jr. | ............. | A61F 11/14 |
| | | | | 381/309 |

\* cited by examiner

SELF-VOICE FEEDBACK IN COMMUNICATIONS HEADSETS

BACKGROUND

This disclosure relates to providing self-voice feedback in communications headsets.

A communications headset, suitable for use in multi-way communications over a telecommunications system, whether wired or wireless, generally includes a microphone for detecting near-end speech uttered by a wearer of the headset. In high noise environments, the microphone also picks up ambient noise, for example, speech uttered by people in close proximity of the headset wearer, and wind noise caused by air moving past the microphone. These noises, if transmitted to a far-end party to a phone call, interfere with the auditory quality of the conversation between the headset wearer and the far-end party.

A wearer of a communications headset with ear cups that occlude the wearer's ears will experience an effect, commonly called the "occlusion effect," which causes the wearer to perceive his voice as having over-emphasized lower frequencies and under-emphasized higher frequencies. In addition to making the wearer's voice sound lower to himself, the removal of the higher frequency sounds from human voice also makes the wearer's voice less intelligible to himself.

SUMMARY

A communications system that includes a purely digital solution for providing self-voice feedback tends to suffer from undesirable psychoacoustic effects due to latency in the digital signal processing path. Providing self-voice feedback using an analog signal processing path, disposed in parallel with, and configured using parameters specified by, the digital signal processing path, can minimize such effects. These parameters can include mic mixing parameters for configuring multiple microphone inputs to improve signal-to-noise, and gain adjustment parameters for computing self-voice feedback gain to compensate for environmental noise.

In general, in some aspects, a communications device includes a first ear cup, a second ear cup, a first output transducer, a second output transducer, a first microphone, a second microphone, first signal processing circuitry, and second signal processing circuitry. The first output transducer is acoustically coupled to an acoustic volume defined by a volume of air within a first ear canal of a wearer of the communications device and a volume of air within the first ear cup. The second output transducer is acoustically coupled to an acoustic volume defined by a volume of air within a second ear canal of the wearer and a volume of air within the second ear cup. The first microphone provides a first signal having a voice component that represents a response of the first microphone to near-end speech. The second microphone provides a second signal having a voice component that represents a response of the second microphone to the near-end speech. The first signal processing circuitry, electrically coupled to the first and the second microphones, is configured to determine, from at least the first signal and the second signal, parameter values including a microphone mixing parameter value and a gain adjustment parameter value, and process the first signal and the second signal according to at least the determined microphone mixing parameter value to produce a gain-adjusted outbound signal carrying the near-end speech for output from the communications device. The second signal processing circuitry, electrically coupled to the first and the second output transducers and the first and the second microphones, is configured to process the first signal and the second signal according to the determined parameter values to produce a combined gain-adjusted near-end signal carrying the near-end speech for output to the first and the second output transducers.

Implementations may include one or more of the following.

The second signal processing circuitry may further include equalization circuitry configured to apply an equalization factor expressed as an equalization curve to the first signal to produce a first equalized signal, wherein a voice component of the first equalized signal matches the voice component of the second signal. The second signal processing circuitry may further include filter circuitry including a first bandpass filter configured to filter the first equalized signal and a second bandpass filter configured to filter the second signal. The first signal processing circuitry may be further configured to produce a first control signal having a value corresponding to the microphone mixing parameter value and a second control signal having a value corresponding to the gain adjustment parameter value. The second signal processing circuitry, electrically coupled to the first signal processing circuitry, may be further configured to receive the first control signal and the second control signal from the first signal processing circuitry, mix the first equalized signal and the second signal according to the first control signal to produce a combined near-end signal, and adjust a gain of the combined near-end signal according to the second control signal to produce the combined gain-adjusted near-end signal.

The first signal has a noise component that represents a response of the first microphone to noise and the second signal has a noise component that represents a response of the second microphone to the noise.

The first signal processing circuitry may be configured to determine, from the first signal and the second signal, the microphone parameter value that optimizes the respective voice components of the first and the second signals while minimizing the respective noise components of the first and the second signals.

The communications device may further include an electronics module configured to receive an inbound audio signal from an audio source that is external to the communications device. The first signal processing circuitry, electrically coupled to the electronics module, may be further configured to receive the inbound audio signal from the electronics module, and process the inbound audio signals to produce a left inbound audio signal and a right inbound audio signal. The second signal processing circuitry, electrically coupled to the first signal processing circuitry and the electronics module, is further configured to sum the left inbound audio signal with the combined gain-adjusted near-end signal to produce a left output signal for output to the first output transducer, and sum the right inbound audio signal with the combined gain-adjusted near-end signal to produce a right output signal for output to the second output transducer. The inbound audio signal may carry far-end speech.

The first signal processing circuitry may be further configured to derive a signal-to-noise ratio based at least in part on respective measured levels of the inbound audio signal, the noise component of the first signal, and the noise component of the second signal, and determine the gain adjustment parameter value based at least in part on the derived signal to noise ratio.

The first microphone may be a velocity microphone and the second microphone may be a pressure microphone. The first microphone and the second microphone may be collocated within one of the first and the second ear cups.

In general, in other aspects, a method includes receiving, from a first microphone of a communications device, a first signal having a voice component that represents a response of the first microphone to near-end speech, receiving, from a second microphone of the communications device, a second signal having a voice component that represents a response of the second microphone to the near-end speech, and processing the first signal and the second signal in parallel digital and analog signal processing paths. The processing includes determining, in the digital signal processing path, from at least the first signal and the second signal, a microphone mixing parameter value, processing, in the digital signal processing path, the first signal and the second signal according to the microphone mixing parameter value to produce a digital summed microphone signal, determining, in the digital signal processing path, from at least the digital summed microphone signal, a gain adjustment parameter value, adjusting, in the digital signal processing path, a gain of the digital summed microphone signal to produce a gain-adjusted outbound signal carrying the near-end speech for output from the communications device, and processing, in the analog signal processing path, the first signal and the second signal according to the determined microphone mixing and the gain adjustment parameter values to produce a combined gain-adjusted near-end signal carrying the near-end speech for output to transducers of the communications device. The method further includes outputting the gain-adjusted outbound signal carrying the near-end speech from the communications device, and outputting the combined gain-adjusted near-end signal carrying the near-end speech to transducers of the communications device.

Implementations may include one or more of the following.

The method may further include applying, in the analog signal processing path, an equalization factor expressed as an equalization curve to the first signal to produce a first equalized signal, wherein a voice component of the first equalized signal matches the voice component of the second signal.

The method may further include applying, in the analog signal processing path, a first bandpass filter to the first equalized signal and a second bandpass filter to the second signal prior to processing the first equalized signal and the second signal according to the determined parameter values to produce the combined gain-adjusted signal carrying the near-end speech for output to the transducers of the communications device.

The analog signal processing path may be a digitally controlled analog signal processing path. The method may further include producing, in the digital signal processing path, a first control signal having a value corresponding to the microphone mixing parameter value and a second control signal having a value corresponding to the gain adjustment parameter value, receiving, in the digitally-controlled analog signal processing path from the digital signal processing path, the first control signal and the second control signal, mixing, in the digitally-controlled analog signal processing path, the first equalized signal and the second signal according to the first control signal to produce a combined near-end signal, and adjusting, in the digitally-controlled analog signal processing path, a gain of the combined near-end signal according to the second control signal to produce the combined gain-adjusted near end signal.

The method may further include receiving, in the digital signal processing path from an audio source that is external to the communications device, an inbound audio signal, processing, in the digital signal processing path, the inbound audio signal to produce a left inbound audio signal and a right inbound audio signal, summing, in the analog signal processing path, the left inbound audio signal with the combined gain-adjusted near-end signal to produce a left output signal for output to a first of the transducers of the communications device, and summing, in the analog signal processing path, the right inbound audio signal with the combined gain-adjusted near-end signal to produce a right output signal for output to a second of the transducers of the communications device. The inbound audio signal may carry far-end speech.

The first signal has a noise component that represents a response of the first microphone to noise and the second signal has a noise component that represents a response of the second microphone to the noise.

The first signal processing circuitry may be further configured to derive a signal-to-noise ratio based at least in part on respective measured levels of the inbound audio signal, the noise component of the first signal, and the noise component of the second signal, and determine the gain adjustment parameter value based at least in part on the derived signal to noise ratio.

The method of determining, in the digital signal processing signal path, from the first signal and the second signal, the microphone mixing parameter value may include determining the microphone mixing parameter value that optimizes the respective voice components of the first and the second signals while minimizing the respective noise components of the first and the second signals.

In general, in some aspects, a method includes receiving, from a first microphone of a communications device, a first signal having a voice component that represents a response of the first microphone to near-end speech, receiving, from a second microphone of the communications device, a second signal having a voice component that represents a response of the second microphone to the near-end speech, and processing the first signal and the second signal in parallel digital and analog signal processing paths. The processing includes determining, in the digital signal processing path, from at least the first signal and the second signal, parameter values including a microphone mixing parameter value and a gain adjustment parameter value, processing, in the digital signal processing path, the first signal and the second signal according to at least the determined microphone mixing parameter value to produce a gain-adjusted outbound signal carrying the near-end speech for output from the communications device, and processing, in the analog signal processing path, the first signal and the second signal according to the determined parameter values to produce a combined gain-adjusted near-end signal carrying the near-end speech for output to transducers of the communications device. The method further includes outputting the gain-adjusted outbound signal carrying the near-end speech from the communications device, and outputting the combined gain-adjusted near-end signal carrying the near-end speech to transducers of the communications device.

Advantages include providing natural-sounding self-voice feedback to the headset wearer with low latency and no echo, and improving self-voice intelligibility in a varying noise environment.

All examples and features mentioned above can be combined in any technically possible way. Other features and advantages will be apparent from the description and the claims.

DESCRIPTION

In this document, implementations of a Bluetooth™-enabled, two earphone communications headset that includes an audio system-on-chip and digitally-controlled analog circuitry are described with reference to FIGS. 1-3. However, the parallel signal processing techniques for providing self-voice feedback to a headset wearer, described below, are applicable to any wired or wireless, circumaural, supra-aural or in-ear communications headset that includes one earphone or a pair of earphones.

Figure 1:
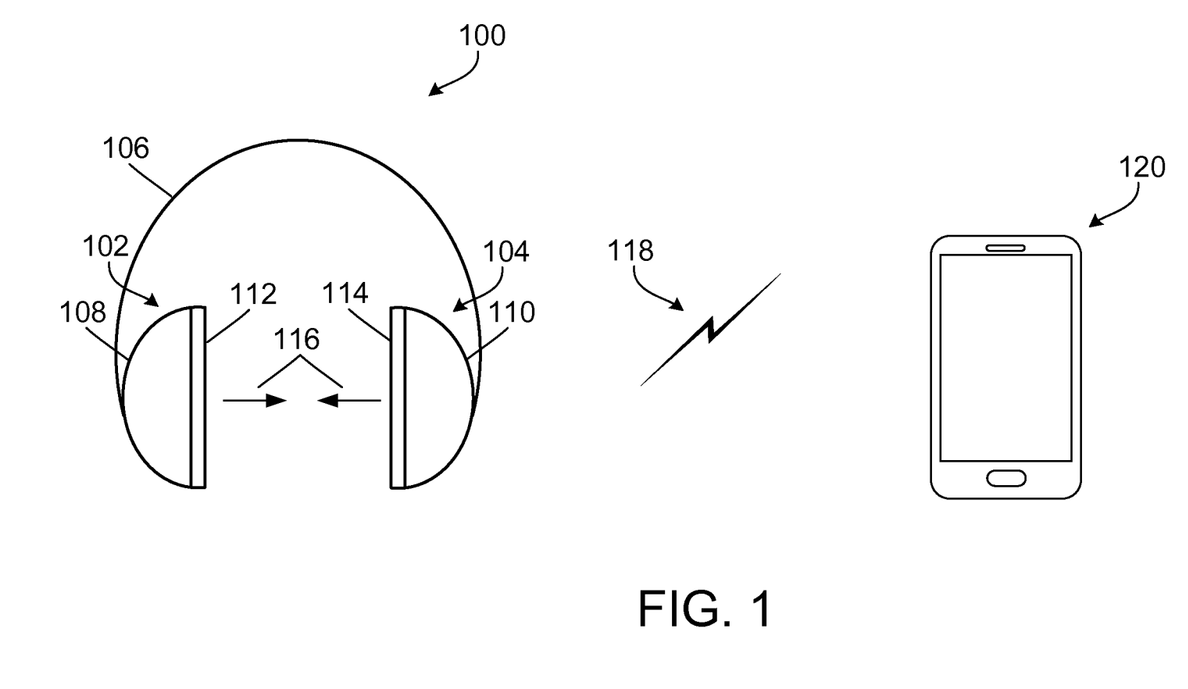
FIG. 1 shows a communications headset that includes two earphones.

FIG. 1 shows a communications headset 100 that includes a left earphone 102 and a right earphone 104 connected by a headband 106. Each earphone 102, 104 includes a respective ear cup 108, 110 and cushion 112, 114. The headband exerts a force in an inward direction as represented by arrows 116. The headset 100 is operable to transmit and receive signals, including audio signals, over a Bluetooth™ link 118 with a paired mobile telephone 120.

When the headset 100 is positioned on a person's head, the cushion 112, 114 of each earphone 102, 104 deforms slightly to form a seal against the headset wearer's ear in the case of a supra-aural headset or against the headset wearer's head in the case of a circumaural headset. In the case of an in-ear headset (not shown), a seal is formed between an earpiece of the earphone and the concha or ear canal of the headset wearer. Each seal significantly reduces the amplitude of external acoustic energy reaching a respective concha and ear canal of the headset wearer. In addition to forming the seals, two acoustic volumes are defined by positioning the headset 100 on the headset wearer's head. One acoustic volume is defined by a volume of air within a left ear canal of the headset wearer and a volume of air within the ear cup 108 of the left earphone 102. Another acoustic volume is similarly defined by the right ear canal of the headset wearer and the ear cup 110 of the right headphone 104.

Figure 2:
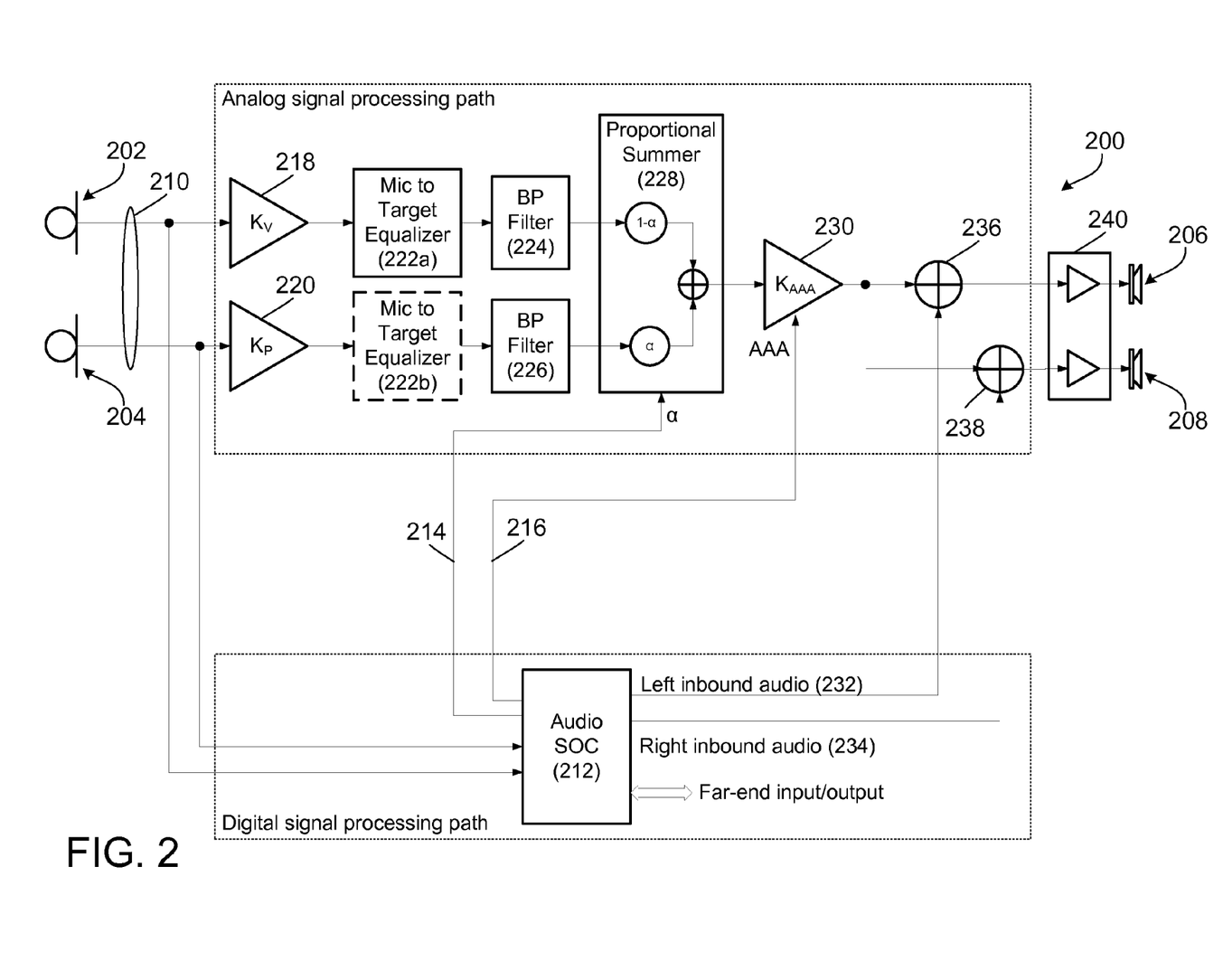
FIG. 2 shows a logical block diagram of a self-voice feedback system.

FIG. 2 shows a logical block diagram of one implementation of a self-voice feedback system 200 that can be deployed within the headset 100 to reduce the occlusion effect (introduced above) that the headset wearer would experience when he speaks, for example, during a phone call, when providing voice commands such as voice dial, and when recording a voice memo, etc. Generally, the self-voice feedback system 200 takes as input signals carrying near-end speech uttered by the headset wearer, processes the input signals within the headset 100, and outputs signals carrying the near-end speech to transducers in the headset 100 to allow the headset wearer to hear his own voice through the headset 100 with minimal delay.

The self-voice feedback system 200 includes two microphones that are collocated within a single earphone, for example, the right earphone 104 of the headset 100 of FIG. 1. The two microphones, represented in FIG. 2 as a velocity microphone 202 and a pressure microphone 204, are electrically coupled to transducers 206, 208 in the left earphone 102 and the right earphone 104, respectively, via parallel digital and digitally-controlled analog signal processing circuitry. Characteristics of velocity microphones and pressure microphones, suitable for use in the self-voice feedback system 200, are described in U.S. Pat. No. 8,620,650, entitled "Rejecting Noise with Paired Microphones," which is incorporated herein by reference. In other examples, both microphones are pressure microphones, and additional processing is used to achieve similar effects to using a velocity microphone.

The velocity microphone 202 produces a signal having a voice component that represents a response of the velocity microphone 202 to near-end speech uttered by the headset wearer and a noise component that represents a response of the velocity microphone 202 to wind noise. The pressure microphone 204 produces a signal having a voice component that represents a response of the pressure microphone 204 to the near-end speech and a noise component that represents a response of the pressure microphone 204 to ambient noise. The signals (collectively, "input microphone signals 210") produced by the velocity microphone 202 and the pressure microphone 204 are processed in parallel digital and digitally-controlled analog signal processing paths.

In some implementations, an audio system-on-chip (SOC) 212 in the digital signal processing path has a flash data structure that stores machine code of a microphone mixing ("mic mixing") algorithm and an automatic audio adjustment ("AAA") algorithm. Details of one exemplary mic mixing algorithm are described in U.S. Pat. No. 8,620,650, entitled "Rejecting Noise with Paired Microphones," which is incorporated herein by reference. Generally, the mic mixing algorithm determines a value for a microphone mixing parameter, $\alpha$, that optimizes the respective voice components of the input microphone signals 210 while minimizing the respective noise components of the input microphone signals 210. Details of one exemplary AAA algorithm are described in U.S. 2012/0076311, entitled "Dynamic Gain Adjustment based on Signal to Ambient Noise Level," which is incorporated herein by reference. Generally, the AAA algorithm derives a signal-to-noise ratio based at least in part on respective measured levels of an inbound audio signal, for example, a signal carrying far-end speech uttered by a far-end party to the phone call, and the respective noise component of the input microphone signals 210, and determines a value for a gain adjustment parameter value, AAA, based at least in part on the derived signal-to-noise ratio.

Figure 3:
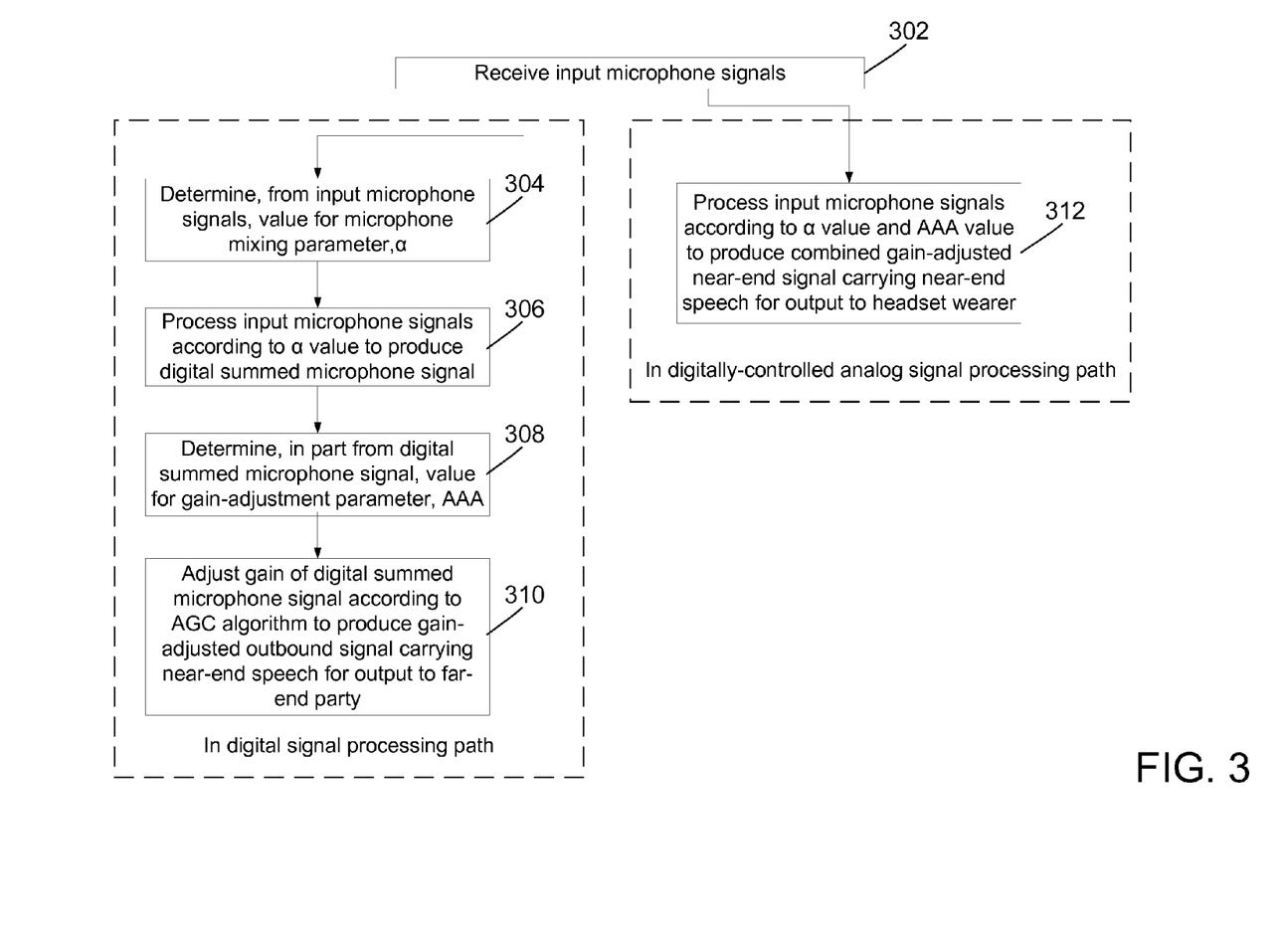
FIG. 3 shows a flow chart of a parallel signal processing process for providing self-voice feedback to a headset wearer.

Referring also to FIG. 3, the audio system-on-chip 212 receives (302) the input microphone signals 210 from the velocity microphone 202 and the pressure microphone 204. The audio system-on-chip 212, executing the machine code for the mic mixing algorithm, determines (304) a value for a microphone mixing parameter, $\alpha$. The audio system-on-chip 212 processes (306) the input microphone signals 210 according to the value of the microphone mixing parameter, $\alpha$, to produce a digital summed microphone signal. The audio system-on-chip 212, executing the machine code of the AAA algorithm, determines (308) a value for a gain-adjustment parameter, AAA, in part from the digital summed microphone signal. The audio system-on-chip 212 adjusts (310) a gain of the digital summed microphone signal according to an automatic gain control (AGC) algorithm to produce a gain-adjusted outbound signal carrying the near-end speech for output from the headset 100, for example, over the Bluetooth™ link 118 to the paired mobile telephone 120.

The audio system-on-chip 212 produces a first control signal 214 having a value corresponding to the value of the microphone mixing parameter, $\alpha$, and a second control signal 216 having a value corresponding to the value of the gain-adjustment parameter, AAA. In some implementations, the audio system-on-chip 212 delivers the first and the second control signals 214, 216 to circuitry in the digitally-controlled analog signal processing path via an I²C (Inter-Integrated Circuit) bus (not shown).

The circuitry in the analog signal processing path includes a first gain stage that is depicted in FIG. 2 by two audio amplifiers 218, 220. The first audio amplifier 218 is electrically coupled to the velocity microphone 202 and is configured to apply a gain, $K_V$, to the signal produced by the velocity microphone 202 to generate a gain-adjusted velocity microphone signal. Similarly, the second audio amplifier 220 is electrically coupled to the pressure microphone 204 and is configured to apply a gain, $K_P$, to the signal produced by the pressure microphone 204 to generate a gain-adjusted pressure microphone signal.

The circuitry in the digitally-controlled analog signal processing path includes a mic-to-target equalizer 222a that is configured to apply an equalization factor to the velocity microphone signal to produce an equalized gain-adjusted velocity microphone signal having a voice component that matches that of the gain-adjusted pressure microphone signal. In some implementations, the equalization factor is expressed as predefined equalization curve as described in U.S. Pat. No. 8,620,650, entitled "Rejecting Noise with Paired Microphones." The circuitry in the digitally-controlled analog signal processing path may, optionally, include a second mic-to-target equalizer 222b that is configured to apply an equalization factor to the pressure microphone signal to produce an equalized gain-adjusted pressure microphone signal having a voice component that matches that of the gain-adjusted velocity microphone signal.

The equalized gain-adjusted velocity microphone signal and the gain-adjusted pressure microphone signal are filtered by respective bandpass filters 224, 226 prior to being fed to a proportional summer 228 in the digitally-controlled analog signal processing path. The proportional summer 228 processes the filtered signals using the value of the microphone mixing parameter, $\alpha$, received over the I²C bus from the audio system-on-chip 212 to produce a combined near-end signal carrying the near-end speech, which is then passed to a second gain stage of the digitally-controlled analog signal processing path. In FIG. 2, the second gain stage is depicted by an amplifier 230 that receives the value of the gain-adjustment parameter, AAA, over the I²C bus from the audio system-on-chip 212 and applies a gain, $K_{AAA}$, to the combined near-end signal carrying the near-end speech to produce (308 of FIG. 3) a combined gain-adjusted near-end signal carrying the near-end speech.

In one example, the audio system-on-chip 212 receives an inbound audio signal carrying far-end speech uttered by the far-end party to the phone call over the Bluetooth™ link 118 from the paired mobile telephone 120 and processes the inbound audio signal using conventional techniques to produce a left inbound audio signal 232 and a right inbound audio signal 234. These left and right inbound audio signals 232, 234 are fed to respective summers 236, 238 of the digitally-controlled analog signal circuitry. The left summer 236 generates a left output signal from the left inbound audio signal 232 and the combined gain-adjusted near-end signal, while a right summer 238 generates a corresponding right output signal from the right inbound audio signal 234 and the combined gain-adjusted near-end signal. The left and the right output signals are subsequently outputted to transducers 206, 208 within the headset 100 via a power amplifier 240.

A number of implementations have been described. Nevertheless, it will be understood that additional modifications may be made without departing from the scope of the inventive concepts described herein. For example, in those implementations in which the communications headset includes one or more microphone arrays, the mic combining function can be parameterized and slowly varying. In addition, although the described implementations use a single gain to control the self-voice feedback level, the techniques described herein are also applicable to loudness compensation. Other embodiments are within the scope of the following claims.

What is claimed is:

1. A communications device comprising:
   a first ear cup and a second ear cup;
   a first output transducer that is acoustically coupled to an acoustic volume defined by a volume of air within a first ear canal of a wearer of the communications device and a volume of air within the first ear cup;
   a second output transducer that is acoustically coupled to an acoustic volume defined by a volume of air within a second ear canal of the wearer and a volume of air within the second ear cup;
   a first microphone to provide a first signal having a voice component that represents a response of the first microphone to near-end speech;
   a second microphone to provide a second signal having a voice component that represents a response of the second microphone to the near-end speech;
   first signal processing circuitry, electrically coupled to the first and the second microphones, being configured to:
      determine, from at least the first signal and the second signal, parameter values including a microphone mixing parameter value and a gain adjustment parameter value;
      process the first signal and the second signal according to at least the determined microphone mixing parameter value to produce a gain-adjusted outbound signal carrying the near-end speech for output from the communications device; and
      produce a first control signal having a value corresponding to the microphone mixing parameter value and a second control signal having a value corresponding to the gain adjustment parameter value; and
   second signal processing circuitry, electrically coupled to the first and the second output transducers and the first and the second microphones, being configured to:
      process the first signal and the second signal according to the determined parameter values to produce a combined gain-adjusted near-end signal carrying the near-end speech for output to the first and the second output transducers by:

receiving the first control signal and the second control signal from the first signal processing circuitry;

mixing the first equalized signal and the second signal according to the first control signal to produce a combined near-end signal; and adjusting a gain of the combined near-end signal according to the second control signal to produce the combined gain-adjusted near-end signal;

wherein the second signal processing circuitry comprises low-latency circuitry and the combined gain-adjusted near-end signal comprises a self-voice feedback signal.

2. The communications device of claim 1, wherein the second signal processing circuitry includes:

equalization circuitry configured to apply an equalization factor expressed as an equalization curve to the first signal to produce a first equalized signal, wherein a voice component of the first equalized signal matches the voice component of the second signal.

3. The communications device of claim 2, wherein the second signal processing circuitry further includes:

filter circuitry including a first bandpass filter configured to filter the first equalized signal and a second bandpass filter configured to filter the second signal.

4. The communications device of claim 1, wherein the first signal has a noise component that represents a response of the first microphone to noise and the second signal has a noise component that represents a response of the second microphone to the noise, and wherein the first signal processing circuitry is configured to determine, from the first signal and the second signal, the microphone parameter value that optimizes the respective voice components of the first and the second signals while minimizing the respective noise components of the first and the second signals.

5. The communications device of claim 1, further comprising:

an electronics module configured to receive an inbound audio signal from an audio source that is external to the communications device; and wherein the first signal processing circuitry, electrically coupled to the electronics module, is further configured to:

receive the inbound audio signal from the electronics module; and process the inbound audio signals to produce a left inbound audio signal and a right inbound audio signal;

wherein the second signal processing circuitry, electrically coupled to the first signal processing circuitry and the electronics module, is further configured to:

sum the left inbound audio signal with the combined gain-adjusted near-end signal to produce a left output signal for output to the first output transducer; and sum the right inbound audio signal with the combined gain-adjusted near-end signal to produce a right output signal for output to the second output transducer.

6. The communications device of claim 5, wherein the inbound audio signal carries far-end speech.

7. The communications device of claim 5, wherein the first signal has a noise component that represents a response of the first microphone to noise and the second signal has a noise component that represents a response of the second microphone to the noise, and wherein the first signal processing circuitry is further configured to:

derive a signal-to-noise ratio based at least in part on respective measured levels of the inbound audio signal, the noise component of the first signal, and the noise component of the second signal; and determine the gain adjustment parameter value based at least in part on the derived signal to noise ratio.

8. The communications device of claim 1, wherein the first microphone is a velocity microphone and the second microphone is a pressure microphone.

9. The communications device of claim 1, wherein the first microphone and the second microphone are collocated within one of the first and the second ear cups.

10. A method comprising:

receiving, from a first microphone of a communications device, a first signal having a voice component that represents a response of the first microphone to near-end speech;

receiving, from a second microphone of the communications device, a second signal having a voice component that represents a response of the second microphone to the near-end speech;

processing the first signal and the second signal in parallel digital and digitally controlled analog signal processing paths, including:

determining, in the digital signal processing path, from at least the first signal and the second signal, a microphone mixing parameter value;

processing, in the digital signal processing path, the first signal and the second signal according to the microphone mixing parameter value to produce a digital summed microphone signal;

determining, in the digital signal processing path, from at least the digital summed microphone signal, a gain adjustment parameter value;

adjusting, in the digital signal processing path, a gain of the digital summed microphone signal to produce a gain-adjusted outbound signal carrying the near-end speech for output from the communications device; and producing, in the digital signal processing path, a first control signal having a value corresponding to the microphone mixing parameter value and a second control signal having a value corresponding to the gain adjustment parameter value; and processing, in the digitally controlled analog signal processing path, the first signal and the second signal according to the determined microphone mixing and the gain adjustment parameter values to produce a combined gain-adjusted near-end signal carrying the near-end speech for output to transducers of the communications device by:

receiving, in the digitally-controlled analog signal processing path from the digital signal processing path, the first control signal and the second control signal;

mixing, in the digitally-controlled analog signal processing path, the first equalized signal and the second signal according to the first control signal to produce a combined near-end signal; and adjusting, in the digitally-controlled analog signal processing path, a gain of the combined near-end signal according to the second control signal to produce the combined gain-adjusted near end signal;

outputting the gain-adjusted outbound signal carrying the near-end speech from the communications device; and outputting the combined gain-adjusted near-end signal carrying the near-end speech to transducers of the communications device;

wherein the digitally-controlled analog signal processing path comprises low-latency circuitry, and the combined gain-adjusted near-end signal comprises a self-voice feedback signal.

11. The method of claim 10, further comprising:

applying, in the analog signal processing path, an equalization factor expressed as an equalization curve to the first signal to produce a first equalized signal, wherein a voice component of the first equalized signal matches the voice component of the second signal.

12. The method of claim 11, further comprising:

applying, in the analog signal processing path, a first bandpass filter to the first equalized signal and a second bandpass filter to the second signal prior to processing the first equalized signal and the second signal according to the determined parameter values to produce the combined gain-adjusted signal carrying the near-end speech for output to the transducers of the communications device.

13. The method of claim 10, further comprising:

receiving, in the digital signal processing path from an audio source that is external to the communications device, an inbound audio signal;

processing, in the digital signal processing path, the inbound audio signal to produce a left inbound audio signal and a right inbound audio signal;

summing, in the analog signal processing path, the left inbound audio signal with the combined gain-adjusted near-end signal to produce a left output signal for output to a first of the transducers of the communications device; and summing, in the analog signal processing path, the right inbound audio signal with the combined gain-adjusted near-end signal to produce a right output signal for output to a second of the transducers of the communications device.

14. The method of claim 13, wherein the inbound audio signal carries far-end speech.

15. The method of claim 13, wherein the first signal has a noise component that represents a response of the first microphone to noise and the second signal has a noise component that represents a response of the second microphone to the noise, and wherein the first signal processing circuitry is further configured to:

derive a signal-to-noise ratio based at least in part on respective measured levels of the inbound audio signal, the noise component of the first signal, and the noise component of the second signal; and determine the gain adjustment parameter value based at least in part on the derived signal to noise ratio.

16. The method of claim 10, wherein the first signal has a noise component that represents a response of the first microphone to noise and the second signal has a noise component that represents a response of the second microphone to the noise, and wherein determining, in the digital signal processing signal path, from the first signal and the second signal, the microphone mixing parameter value includes:

determining the microphone mixing parameter value that optimizes the respective voice components of the first and the second signals while minimizing the respective noise components of the first and the second signals.

17. The method of claim 10, wherein the first microphone is a velocity microphone and the second microphone is a pressure microphone.

18. The method of claim 10, wherein the first microphone and the second microphone are collocated within an ear cup of the communications device.

19. A method comprising:

receiving, from a first microphone of a communications device, a first signal having a voice component that represents a response of the first microphone to near-end speech;

receiving, from a second microphone of the communications device, a second signal having a voice component that represents a response of the second microphone to the near-end speech;

processing the first signal and the second signal in parallel digital and digitally controlled analog signal processing paths, including:

determining, in the digital signal processing path, from at least the first signal and the second signal, parameter values including a microphone mixing parameter value and a gain adjustment parameter value;

processing, in the digital signal processing path, the first signal and the second signal according to at least the determined microphone mixing parameter value to produce a gain-adjusted outbound signal carrying the near-end speech for output from the communications device; and producing, in the digital signal processing path, a first control signal having a value corresponding to the microphone mixing parameter value and a second control signal having a value corresponding to the gain adjustment parameter value; and processing, in the digitally controlled analog signal processing path, the first signal and the second signal according to the determined parameter values to produce a combined gain-adjusted near-end signal carrying the near-end speech for output to transducers of the communications device; by:

receiving, in the digitally-controlled analog signal processing path from the digital signal processing path, the first control signal and the second control signal;

mixing, in the digitally-controlled analog signal processing path, the first equalized signal and the second signal according to the first control signal to produce a combined near-end signal; and adjusting, in the digitally-controlled analog signal processing path, a gain of the combined near-end signal according to the second control signal to produce the combined gain-adjusted near end signal;

outputting the gain-adjusted outbound signal carrying the near-end speech from the communications device; and outputting the combined gain-adjusted near-end signal carrying the near-end speech to transducers of the communications device;

wherein the digitally-controlled analog signal processing path comprises low-latency circuitry, and the combined gain-adjusted near-end signal comprises a self-voice feedback signal.

\* \* \* \* \*